US012725489B2

(12) United States Patent
Charles et al.

(10) Patent No.: US 12,725,489 B2
(45) Date of Patent: Sep. 1, 2026

(54) GAMING SYSTEM AND METHOD WITH SYMBOL CLUSTER FEATURE

(71) Applicant: LNW Gaming, Inc., Las Vegas, NV (US)

(72) Inventors: Emma Charles, Beaconsfield (AU); Lloyd Sefton, Beaconsfield (AU)

(73) Assignee: LNW Gaming, Inc., Las Vegas, NV (US)

( * ) Notice: Subject to any disclaimer, the term of this patent is extended or adjusted under 35 U.S.C. 154(b) by 269 days.

(21) Appl. No.: 18/744,984

(22) Filed: Jun. 17, 2024

(65) Prior Publication Data

US 2025/0078626 A1 Mar. 6, 2025

Related U.S. Application Data

(60) Provisional application No. 63/580,049, filed on Sep. 1, 2023.

(51) Int. Cl.
*G07F 17/32* (2006.01)

(52) U.S. Cl.
CPC ...... *G07F 17/3267* (2013.01); *G07F 17/3213* (2013.01); *G07F 17/3246* (2013.01); *G07F 17/3265* (2013.01)

(58) Field of Classification Search
CPC ............. G07F 17/3267; G07F 17/3213; G07F 17/3246; G07F 17/3265
See application file for complete search history.

(56) References Cited

U.S. PATENT DOCUMENTS

| | | | | |
|---|---|---|---|---|
| 7,192,343 | B2 * | 3/2007 | Vancura | G07F 17/3244 463/20 |
| 7,402,102 | B2 | 7/2008 | Marks et al. | |
| 8,292,724 | B2 * | 10/2012 | Marks | G07F 17/3227 463/16 |
| 8,734,223 | B2 * | 5/2014 | Zoble | G07F 17/34 463/20 |
| 9,275,523 | B1 * | 3/2016 | Hughes | G07F 17/3213 |
| 9,483,900 | B2 * | 11/2016 | Aoki | G07F 17/3244 |
| 9,836,922 | B2 * | 12/2017 | Jackson | G07F 17/326 |
| 9,993,721 | B2 * | 6/2018 | Palermo | A63F 9/24 |
| 10,546,466 | B2 * | 1/2020 | Lee | G07F 17/34 |
| 10,810,828 | B2 | 10/2020 | Reynolds et al. | |
| 10,964,173 | B2 | 3/2021 | Hawkins et al. | |
| 11,450,178 | B2 | 9/2022 | Penacho et al. | |
| 11,468,746 | B2 | 10/2022 | Hawkins et al. | |
| 11,475,731 | B2 | 10/2022 | Reynolds et al. | |
| 11,798,350 | B2 * | 10/2023 | Knight | G07F 17/3213 |
| 11,972,655 | B2 * | 4/2024 | Mirjavadi | G07F 17/3213 |
| 12,002,329 | B2 | 6/2024 | Soong | |

(Continued)

*Primary Examiner* — Malina D. Blaise

(57) ABSTRACT

There is provided a gaming system, gaming machine, and method that utilize a presentation assembly configured to present a plurality of reels and an array. The plurality of reels bear a plurality of symbols including clusters of multiple value-bearing symbols. The reels are spun and stopped to land symbols from the plurality of symbols in the array. In response to the landed symbols including a triggering combination of clusters of value-bearing symbols, each cluster is disbanded by animating distribution of the value-bearing symbols in each cluster to different positions in the array. The presentation assembly presents an award based at least in part on the distributed value-bearing symbols.

18 Claims, 7 Drawing Sheets

(56) References Cited

U.S. PATENT DOCUMENTS 12,094,305 B2* 9/2024 Hawkins ................. G07F 17/32
2005/0054429 A1* 3/2005 Baerlocher ............. G07F 17/32 463/20
2005/0148384 A1* 7/2005 Marks ................. G07F 17/3244 463/20
2008/0113735 A1* 5/2008 Maya ...................... G07F 17/32 463/20
2008/0182650 A1* 7/2008 Randall ................... G07F 17/34 463/25
2009/0239634 A1* 9/2009 Nguyen .................. G07F 17/34 463/20
2010/0248811 A1* 9/2010 Jaffe ................... G07F 17/3239 463/20
2011/0086695 A1* 4/2011 Evans ..................... G07F 17/32 463/43
2011/0111825 A1* 5/2011 Caputo ............... G07F 17/3265 463/20
2011/0136562 A1* 6/2011 Loat .................... G07F 17/3267 463/20
2012/0238348 A1* 9/2012 Aoki ................... G07F 17/3213 463/43
2013/0065663 A1* 3/2013 Johnson .............. G07F 17/3213 463/20
2013/0184045 A1* 7/2013 Vermaak ............. G07F 17/3267 463/20
2013/0190065 A1* 7/2013 Saunders ............ G07F 17/3213 463/20
2013/0190066 A1* 7/2013 Saunders ............ G07F 17/3213 463/20
2013/0231174 A1* 9/2013 Fujisawa ............... G07F 17/326 463/20
2014/0018146 A1* 1/2014 Zielinski ............. G07F 17/3267 463/20
2014/0228091 A1* 8/2014 Berman .................. G07F 17/34 463/20
2014/0256410 A1* 9/2014 Basallo ............... G07F 17/3244 463/25
2014/0274282 A1* 9/2014 Mastropietro .......... G07F 17/34 463/20
2014/0274288 A1* 9/2014 Hornik .................. G07F 17/326 463/20
2014/0274316 A1* 9/2014 Elias ................... G07F 17/3241 463/25
2014/0335928 A1* 11/2014 Fujisawa ................ G07F 17/34 463/20
2015/0141114 A1* 5/2015 Davis ...................... G07F 17/34 463/20
2015/0154834 A1* 6/2015 Grace ................ G07F 17/3244 463/20
2015/0161853 A1* 6/2015 Ryan ....................... G07F 17/34 463/20
2015/0170462 A1* 6/2015 Berman .................. G07F 17/34 463/20
2015/0213673 A1* 7/2015 Elias ....................... A63F 5/045 463/19
2016/0078711 A1* 3/2016 Rucker .................. G07F 17/34 463/21
2016/0093141 A1* 3/2016 Nelson .................. G07F 17/326 463/20
2016/0093153 A1 3/2016 Hawkins et al.
2016/0104345 A1* 4/2016 MacGregor ......... G07F 17/3239 463/20
2016/0125688 A1* 5/2016 Hoffman ................ G07F 17/34 463/20
2016/0133094 A1* 5/2016 Thomas .............. G07F 17/3246 463/20
2016/0140809 A1* 5/2016 Berman .............. G07F 17/3244 463/20
2017/0124809 A1* 5/2017 Elias .................. G07F 17/3246
2018/0047257 A1* 2/2018 Vasas .................. G07F 17/3244
2019/0073860 A1* 3/2019 Reynolds ............ G07F 17/3213
2020/0111298 A1* 4/2020 Crispino ............. G07F 17/3213
2020/0302754 A1* 9/2020 Fong ................... G07F 17/3262
2021/0035403 A1 2/2021 Reynolds et al.
2021/0043038 A1* 2/2021 Marks ................. G07F 17/3211
2021/0201629 A1 7/2021 Hawkins et al.
2021/0241570 A1* 8/2021 Robinson ............ G07F 17/3265
2021/0304562 A1* 9/2021 Penacho ............. G07F 17/3262
2021/0304566 A1* 9/2021 Penacho ............. G07F 17/3244
2021/0312756 A1* 10/2021 Penacho ............. G07F 17/3262
2021/0366236 A1* 11/2021 Soong ................. G07F 17/3267
2022/0301522 A1* 9/2022 Elmqvist ................... G06F 3/14
2022/0327894 A1 10/2022 Soong
2022/0351578 A1* 11/2022 Delekta ............... G07F 17/3265
2023/0005338 A1 1/2023 Penacho et al.
2023/0021862 A1 1/2023 Hawkins et al.
2023/0094183 A1* 3/2023 Jairath ................ G07F 17/3265 463/20
2023/0316871 A1* 10/2023 Marks ................. G07F 17/3293 463/20
2023/0351841 A1* 11/2023 Jackson .............. G07F 17/3213
2024/0404345 A1* 12/2024 Jenkins ............... G07F 17/3213
2025/0005995 A1* 1/2025 Boese ...................... G07F 17/34
2025/0153277 A1* 5/2025 Chan .................... B23K 26/073
2026/0100089 A1* 4/2026 Baker ................. G07F 17/3213

* cited by examiner

GAMING SYSTEM AND METHOD WITH SYMBOL CLUSTER FEATURE

RELATED APPLICATIONS

This patent application claims the benefit of U.S. Provisional Patent Application No. 63/580,049 filed Sep. 1, 2023, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to new and improved animations in connection with a symbol cluster feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly configured to present a plurality of reels and an array. The plurality of reels bear a plurality of symbols including clusters of multiple value-bearing symbols. The reels are spun and stopped to land symbols from the plurality of symbols in the array. In response to the landed symbols including a triggering combination of clusters of value-bearing symbols, each cluster is disbanded by animating distribution of the value-bearing symbols in each cluster to different positions in the array. The animation may, for example, include enlarging and moving the value-bearing symbols in each cluster. The presentation assembly presents an award based at least in part on the distributed value-bearing symbols.

Additional aspects of the invention will be apparent to those of ordinary skill in the art in view of the detailed description of various embodiments, which is made with reference to the drawings, a brief description of which is provided below.

Figure 1:
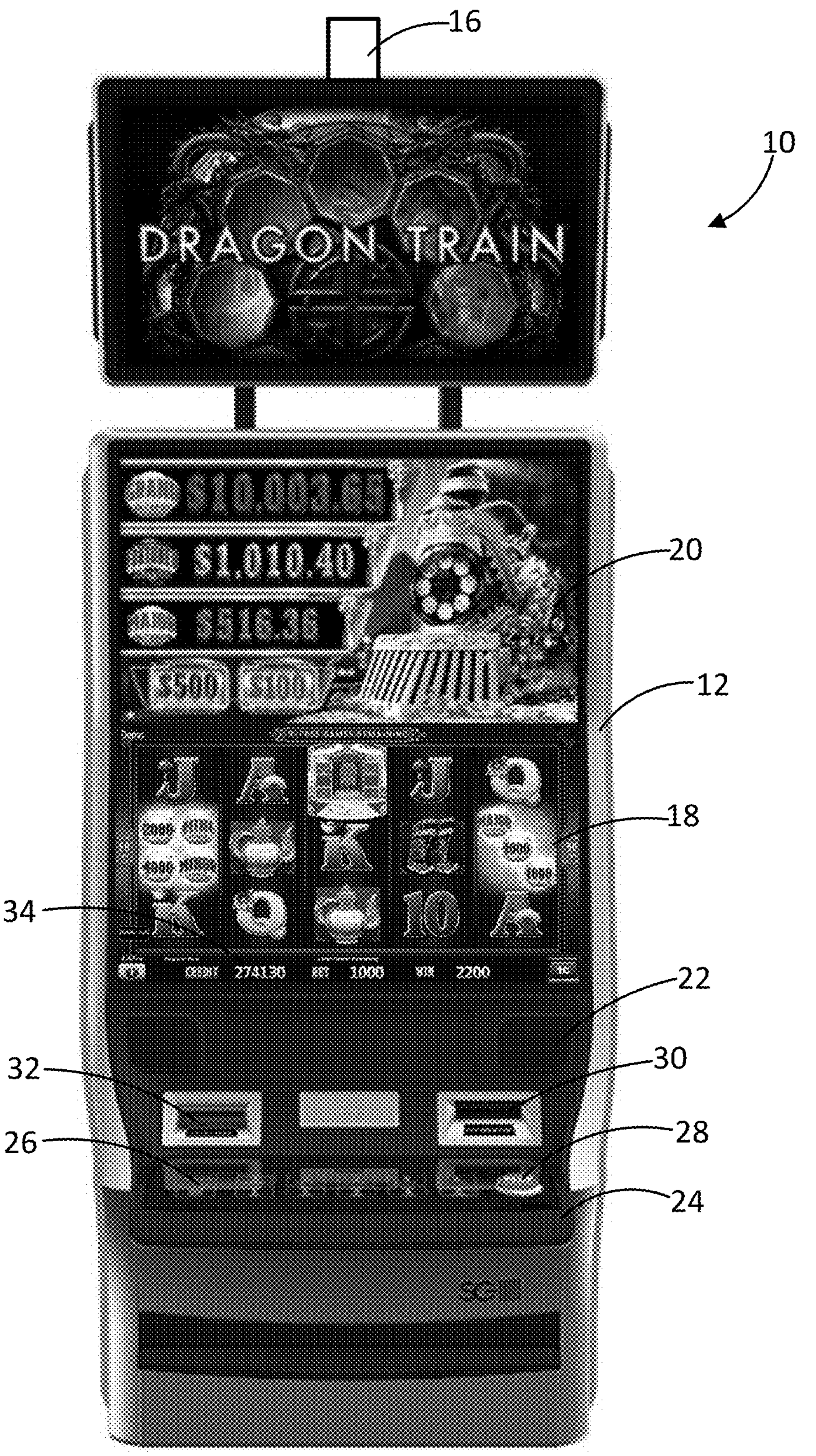
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) mounted over the primary or secondary presentation devices, an input deck 24 supporting a video button panel 26 bearing touch keys and one or more mechanical push-buttons 28, a bill/ticket acceptor 30, a card reader/writer (not shown), a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, video button panel 26, push-buttons 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credit" meter 34. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 30, a card reader/writer (not shown), a wireless communication interface for reading cash or credit data from a nearby mobile device, and a network interface for withdrawing cash or credits from a remote account via an electronic funds transfer. In response to a cashout input that initiates a payout from the credit balance on the "credit" meter 34, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
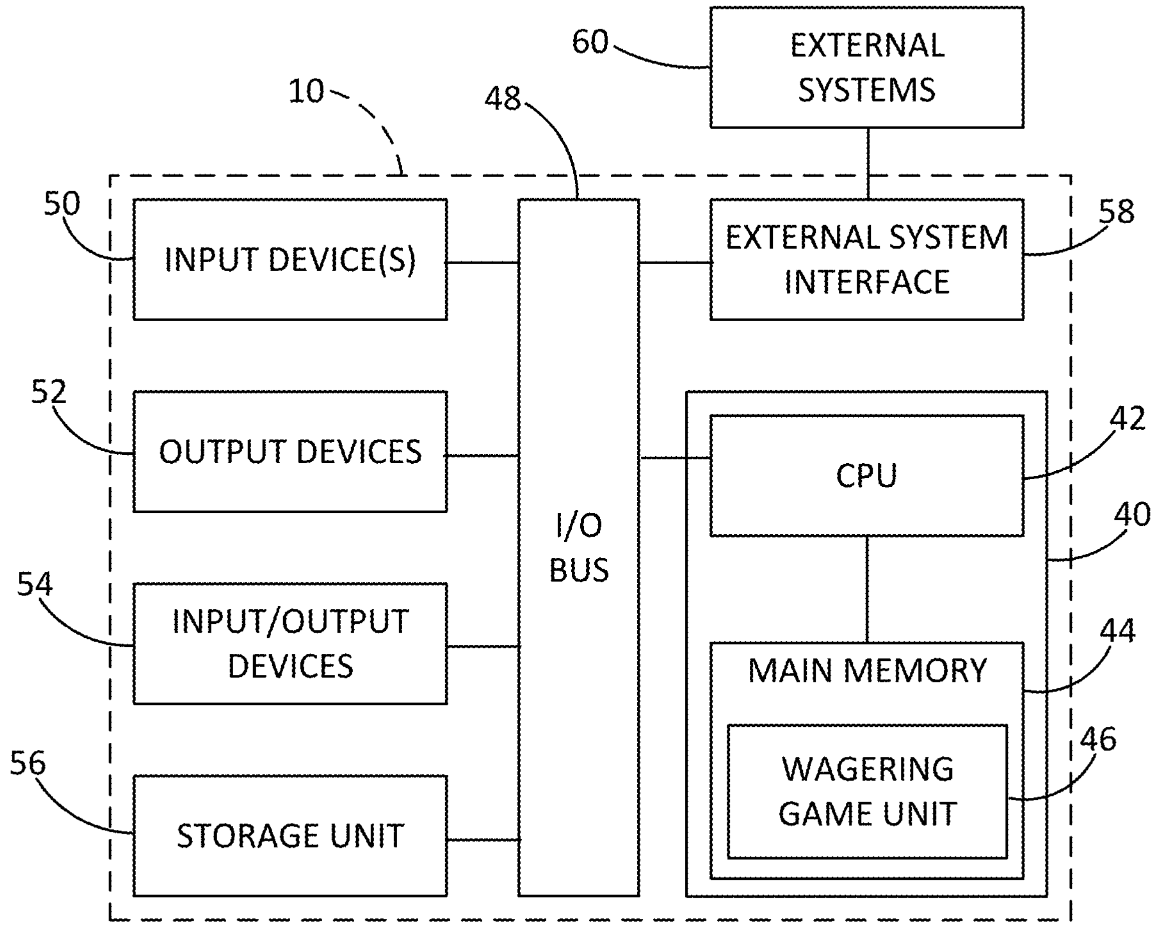
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
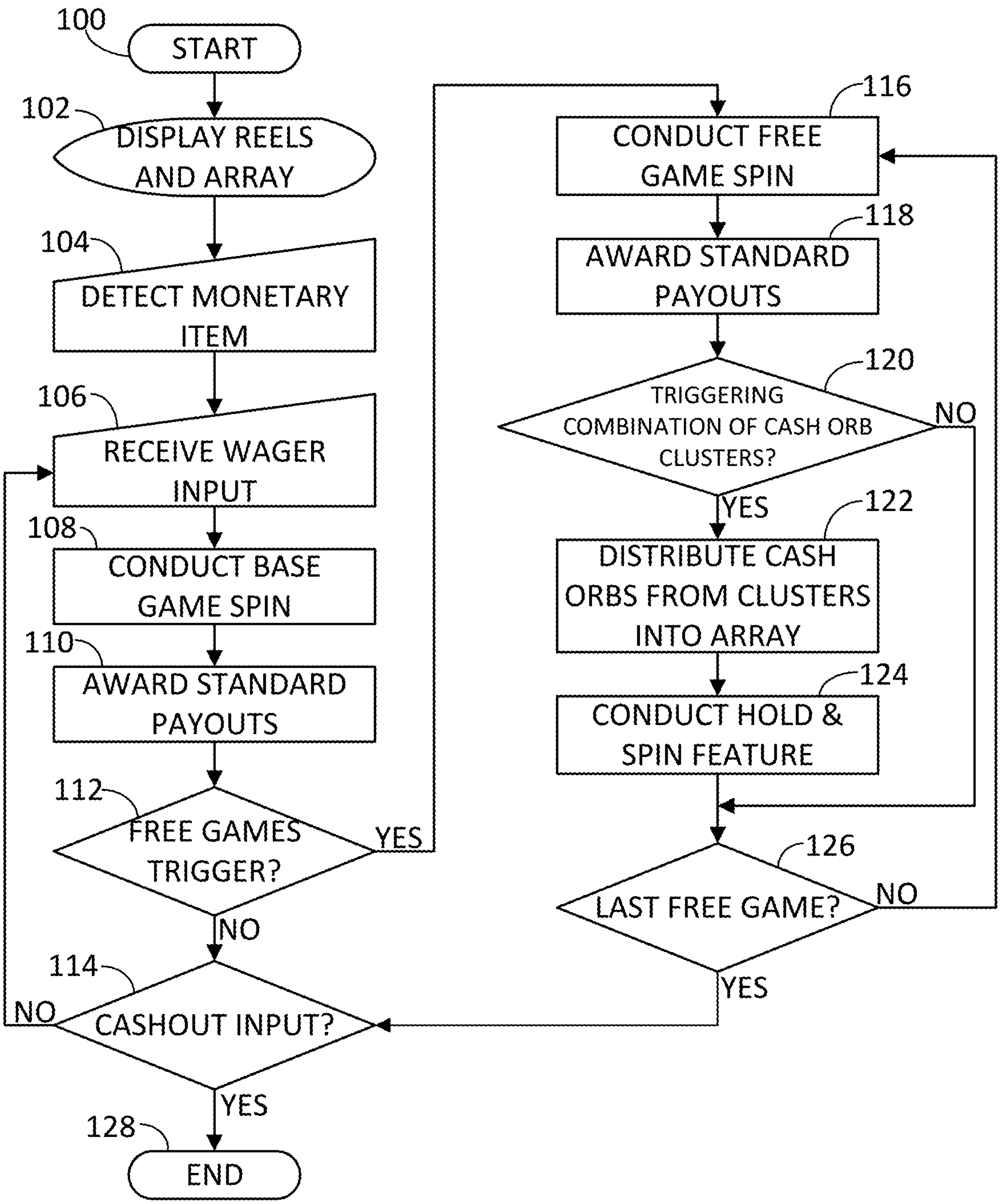
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcomes in FIGS. 4-10, cluster mapping diagram in FIG. 11, and animation snapshots in FIGS. 12-20.

The data processing method commences at step 100. At step 102, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position.

In the examples shown in FIGS. 4-10, the presentation device presents a three-by-five array 206 comprising three rows and five columns, and the columns are associated with respective reels 208*a*, 208*b*, 208*c*, 208*d*, 208*e*. The reels bear a plurality of symbols including thematic symbols, royal symbols (e.g., 10, J, Q, K, and A), and value-bearing symbols in the form of cash orbs that are generally round in shape. A single cash orb (value-bearing symbol) may occupy a position in the symbol array (e.g., symbol 211 in FIG. 4), or multiple cash orbs may appear in a cluster occupying a position in the symbol array (e.g., clusters 212, 214, and 216 in FIGS. 4-5). Each cash orb is associated with a cash or credit value indicated on the cash orb itself. The value may be a progressive jackpot (e.g., Mini, Minor, Major, Fortune 8, or Grand). The value on a particular cash orb may be fixed or variable (e.g., random) from one spin cycle to the next. Different cash orbs may have different values. A Dragon Train symbol (see FIGS. 6-7) serves as a Wild that substitutes for a cash orb. The cash orbs may appear on all the reels or on only a subset of less than all the reels. In one embodiment, during a free games feature, the cash orbs only appear on the first reel 208*a* and the fifth reel 208*e*.

At step 104, the game-logic circuitry detects, via a value input device, a physical item associated with a monetary value that establishes a monetary balance. The monetary balance may be shown on a credit meter 200 (see FIG. 4).

At step 106, the game-logic circuitry initiates a wagering game cycle (i.e., spin cycle) in response to an input indicative of a wager covered by the monetary balance. To initiate a spin of the reels, the player may press a "Spin" or "Max Bet" key on a button panel or touch screen. The wager may be shown on a bet meter 202 (see FIG. 4).

Figure 4:
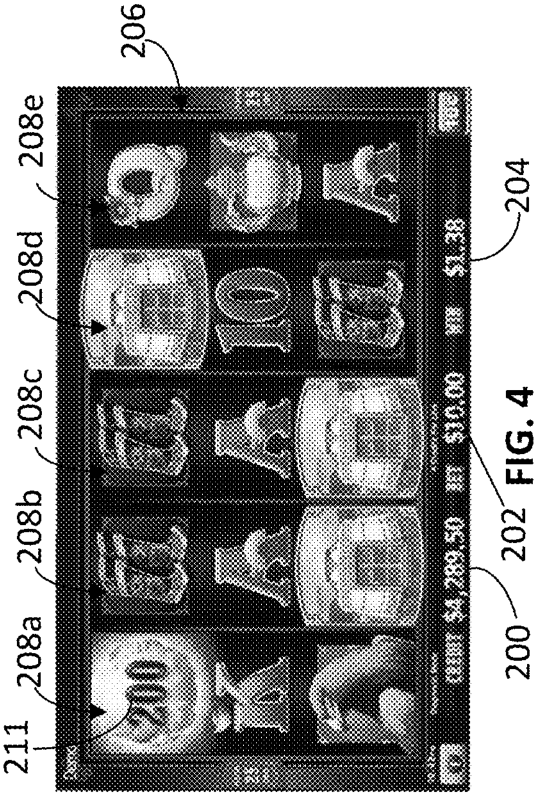

At step 108, the game-logic circuitry conducts a base game spin. Using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. FIG. 4 depicts an outcome of a base-game reel spin.

At step 110, the game-logic circuitry awards standard payouts in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. The awarded pays are added to a win meter 204 (see FIG. 4).

At step 112, the game-logic circuitry determines whether or not a free games feature has been triggered. If a free games feature has not been triggered, the method proceeds to step 114. If, however, a free games feature has been triggered, the game-logic circuitry commences a series of free games at step 116. The number of free games in the series may, for example, be five free games. In one embodiment, three or more scattered TENT symbols in the array trigger the free games feature. FIG. 4 depicts a base-game spin outcome including three scattered TENT symbols on reels 208*b*, 208*c*, and 208*d*, thus triggering the free games feature.

Figure 5:
FIGS. 4-10 illustrate examples of displayed spin outcomes resulting from the flow diagram in FIG. 3.

At step 116, the game-logic circuitry conducts a free game spin. Using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. FIG. 5 depicts an outcome of a free-game reel spin.

At step 118, the game-logic circuitry awards standard payouts in accordance with a pay table, which may be similar to the pay table used in the base game. In the example shown in FIG. 5, a standard payout is awarded for a winning combination of three BOOT symbols 210.

At step 120, the game-logic circuitry determines whether or not a triggering combination of cash orb clusters has appeared in the array. In one embodiment, in the free games feature, cash orb clusters only appear on the first reel 208*a* and the fifth reel 208*e*. Each cluster consists of 2, 3, 4, 5, or 6 cash orbs. The cash orbs in a cluster are arranged like pips on a die, i.e., in die pip patterns. In other words, 2, 3, 4, 5, or 6 cash orbs may land in a single position of the array, appearing in pip patterns ⚁, ⚂, ⚃, ⚄, or ⚅, respectively. In one embodiment, a triggering combination is comprised of six or more scattered cash orbs, meaning that triggering pairs of clusters on the first and fifth reels (or vice versa) may be ⚁ and ⚃; ⚁ and ⚄; ⚁ and ⚄; ⚃ and ⚃; ⚃ and ⚄; ⚃ and ⚄; ⚃ and ⚁; ⚃ and ⚃; ⚃ and ⚄; ⚃ and ⚁; ⚄ and ⚄; ⚄ and ⚁; ⚁ and ⚁.

If the triggering combination of cash orb clusters has not appeared in the array at step 120, the method proceeds to step 126 where it either returns to step 116 if it has not played the last free game in the series or proceeds to step 114 if it has played the last free game in the series.

Figure 7:
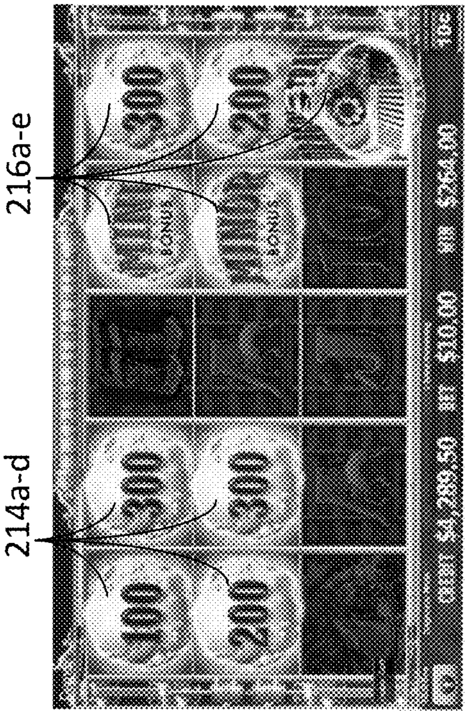
Figure 6:
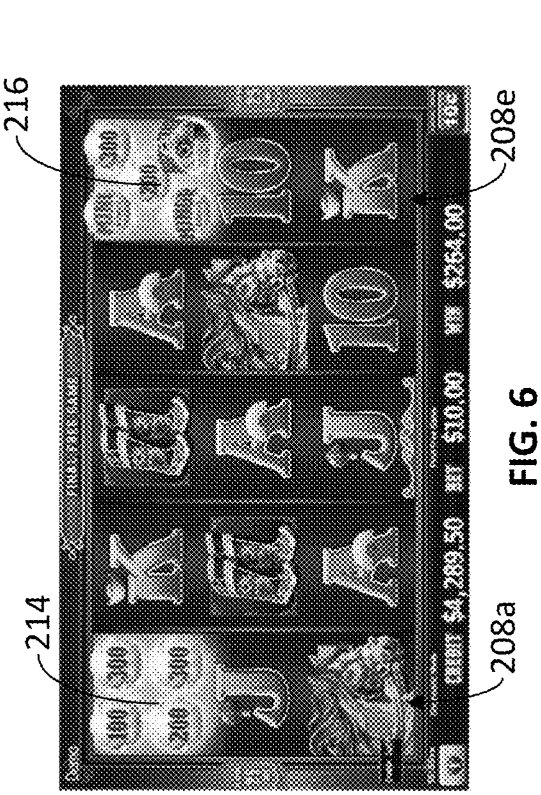
Figure 11:
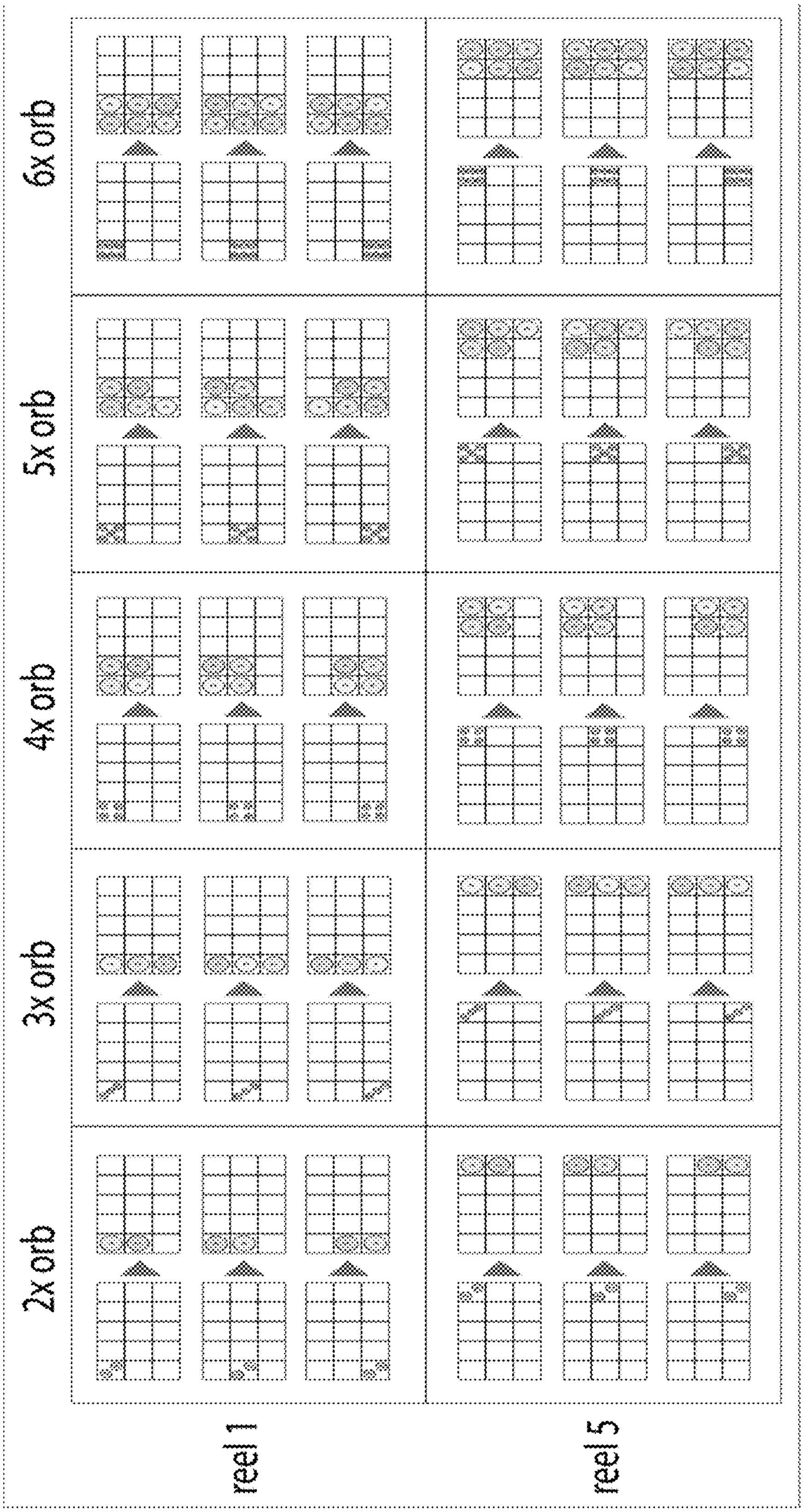
FIG. 11 is a cluster mapping diagram illustrating how clustered cash orbs are transferred to unique positions in the symbol array when a hold-and-spin feature is triggered.
Figure 12:
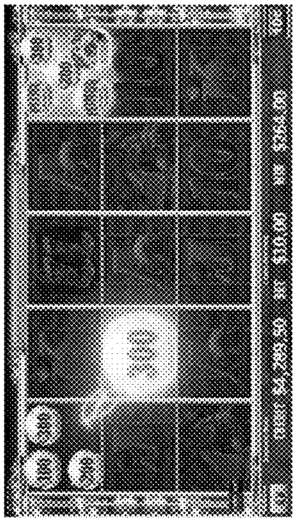
FIGS. 12-20 represent successive snapshots within an animation for transitioning from the clusters of cash orbs in FIG. 6 to the distributed cash orbs in FIG. 7.
Figure 13:
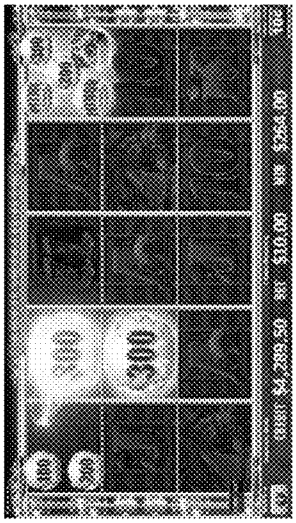
Figure 14:
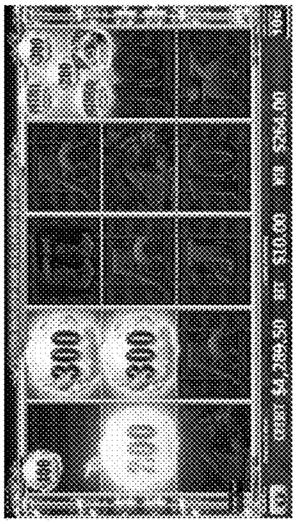
Figure 15:
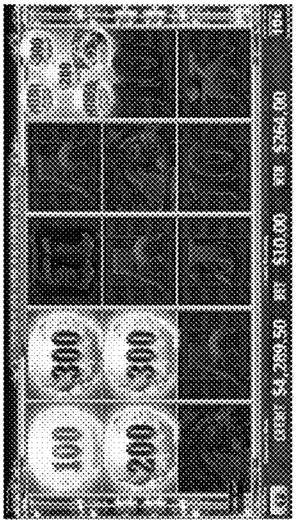
Figure 16:
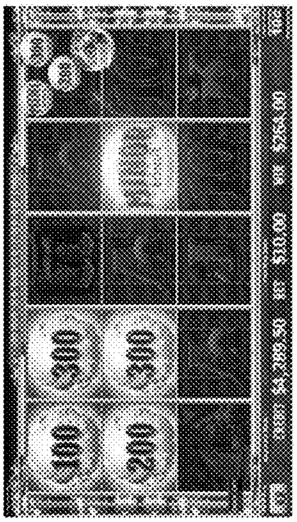
Figure 17:
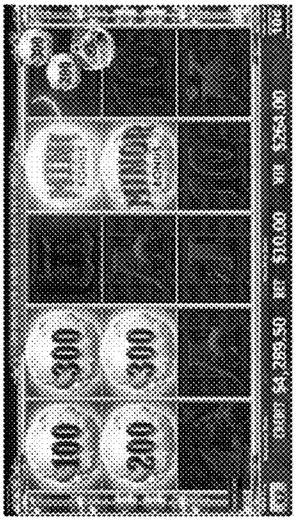
Figure 18:
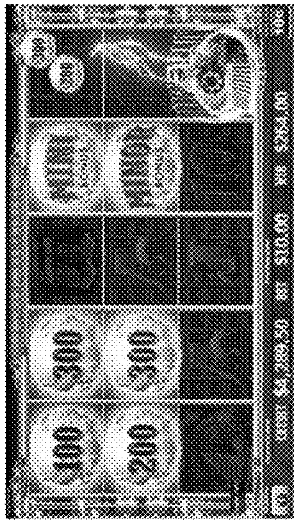
Figure 19:
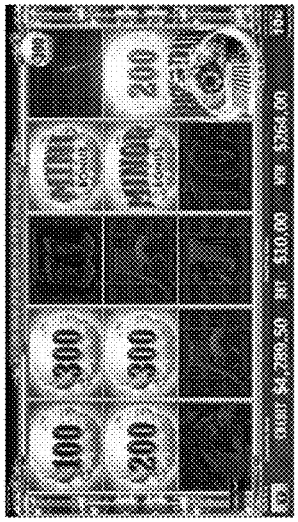
Figure 20:
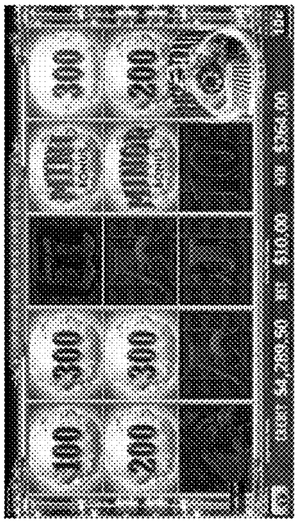

If, however, the triggering combination of cash orb clusters has appeared in the array at step 120, the method proceeds to steps 122 and 124. FIG. 6 depicts a triggering combination of a cluster 214 of four cash orbs on the first reel 208*a* and a cluster 216 of five cash orbs (including a Dragon Train symbol substituting for a cash orb) on the fifth reel 208*e*. At step 122, the clusters are disbanded by moving each cash orb in the clusters to a unique position in the array such that each cash orb occupies its own position and is no longer clustered with other cash orbs. In general, the cash orbs in a cluster are distributed among nearby positions in the array. More specifically, FIG. 11 is a cluster mapping diagram illustrating how cash orbs in different types of clusters are distributed to different positions in the array. In accordance with the diagram, FIG. 7 depicts the cash orbs 214*a-d* distributed from the cluster 214 in FIG. 6 and the cash orbs 216*a-e* distributed from the cluster 216 in FIG. 6. The game-logic circuitry may animate the movement of the cash orbs from the clusters by first successively moving and enlarging the cash orbs in the first cluster to their respective array positions and then successively moving and enlarging the cash orbs in the second cluster to their respective array positions. FIGS. 12-20 represent successive snapshots within the animation for transitioning from the clusters in FIG. 6 to the distributed cash orbs in FIG. 7.

Figure 9:
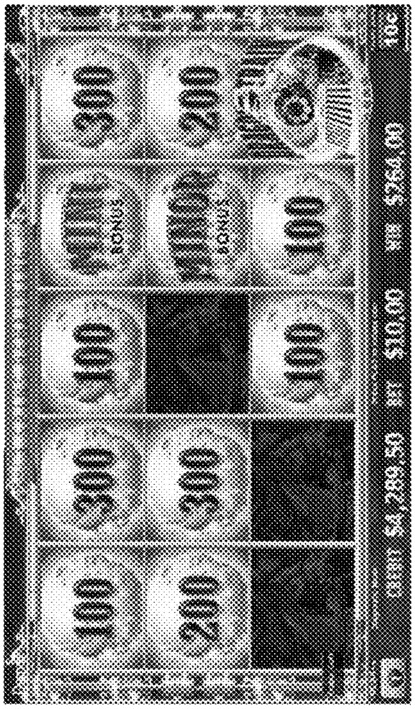
Figure 8:
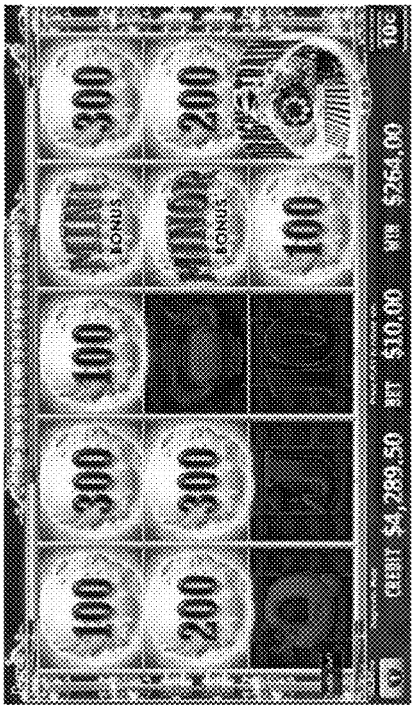
Figure 10:
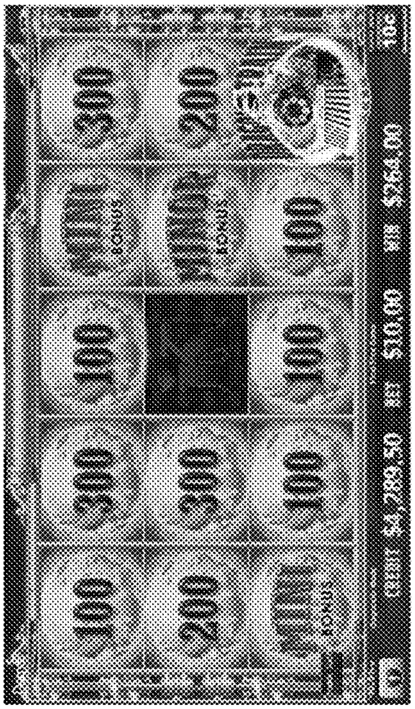

After distributing the cash orbs to unique array positions at step 122, the game-logic circuitry conducts a hold-and-spin feature at step 124. In the hold-and-spin feature, three reel spins are initially awarded. During the hold-and-spin feature, the only active symbols on the reels are cash orbs and the Dragon Train symbol; all other symbols are grayed out to indicate they are inactive. Each cash orb occupies its own position, i.e., the cash orbs are not clustered, during the hold-and-spin feature. All distributed cash orbs are held in place in the array for the duration of the hold-and-spin feature. During each spin, if one or more new cash orbs land in the array, then the number of remaining spins in the feature is reset to three, and the new cash orbs are held in place in the array for the remainder of the feature. When the reels are spun with the cash orbs held in place, the reel spin may be animated to show only those portions of the spinning reels that are not covered by the held cash orbs. When the reels are spun in FIG. 7, for example, the first, second, and fourth spinning reels would only be visible along the bottom row of the array, the third spinning reel would be visible along the entire third column of the array, and the fifth spinning reel would not be visible at all. FIGS. 8 through 10 are examples of displayed spin outcomes during the hold-and-respin feature. It can be seen that new cash orbs landed in the array over the course of the feature, resulting in fourteen positions of the array being occupied by respective cash orbs in FIG. 10 when no more spins remained, i.e., the number of remaining spins reached zero. At the conclusion of the hold-and-respin feature, the game-logic circuitry awards the values borne by the cash orbs in the array and adds the total award to the win meter. The Dragon Train symbol (which substitutes for a cash orb) may, for example, award a random cash or credit value and/or a progressive jackpot or a secondary feature that awards a random cash or credit value and/or a progressive jackpot.

After conducting the hold-and-spin feature, the method proceeds to step 126 where it either returns to step 116 if it has not played the last free game in the series or proceeds to step 114 if it has played the last free game in the series.

At step 114, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the credit meter to a value output device. The data processing method then ends at step 128.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

generating, by game-logic circuitry of the gaming machine via execution of an authentication program stored in one or more memory devices of the game-logic circuitry, a live authentication code based on contents of at least one of the one or more memory devices;

comparing, by the game-logic circuitry, the live authentication code to a trusted authentication code stored in the one or more memory devices;

permitting execution of random-number-generator programming and game-outcome logic based on the comparing; and in response to permitting execution of the random-number-generator programming and the game-outcome logic;

presenting, by a presentation assembly, a plurality of reels and an array having a plurality of positions, the plurality of reels bearing a plurality of symbols, the plurality of symbols including clusters of multiple value-bearing symbols, each cluster of the clusters of multiple value-bearing symbols, when landed, occupying a single respective position of the array with the multiple value-bearing symbols of the cluster appearing within the single respective position, and each value-bearing symbol bearing a respective credit value;

spinning and stopping the plurality of reels to land symbols from the plurality of symbols in respective positions of the array; and in response to the landed symbols including a triggering combination of clusters of value-bearing symbols;

disbanding each cluster by animating distribution of the value-bearing symbols in each cluster from the single respective position previously occupied by the cluster to different positions of the array such that, after the disbanding, each value-bearing symbol of the cluster occupies its own respective position of the array and is no longer clustered with other value-bearing symbols of the cluster; and presenting, on the presentation assembly, an award based at least in part on credit values borne by the distributed value-bearing symbols.

2. The method of claim 1, wherein the spinning and stopping operation occurs in a free games feature that is triggered in response to a base-game spin outcome.

3. The method of claim 1, wherein the value-bearing symbols in each cluster are arranged in a respective standard die pip pattern.

4. The method of claim 1, wherein the clusters in the triggering combination include at least a predetermined number of the value-bearing symbols.

5. The method of claim 4, wherein the predetermined number is six.

6. The method of claim 1, further including after the disbanding operation, conducting, by game-logic circuitry, a hold-and-spin feature using a second plurality of reels, the second plurality of reels bearing a plurality of additional value-bearing symbols, the hold-and-spin feature including:

holding the distributed value-bearing symbols in place in the array; and spinning and stopping the second plurality of reels and holding any of the additional value-bearing symbols that land in an unoccupied position in the array;

wherein the presented award is based at least in part on the distributed value-bearing symbols and the held additional value-bearing symbols.

7. The method of claim 1, wherein the operation of disbanding each cluster by animating distribution of the value-bearing symbols in each cluster to different positions in the array includes enlarging and moving the value-bearing symbols in each cluster.

8. The method of claim 1, further comprising:

detecting, via a value input device, a physical item associated with a monetary value that establishes a monetary balance; and dispensing, via a value output device, a payout in response to a cashout input that initiates a payout from the monetary balance.

9. The method of claim 1, wherein the gaming machine is regulatorily approved and primarily dedicated to playing a wagering game.

10. A gaming system comprising:

a gaming machine including a presentation assembly configured to present a plurality of reels and an array having a plurality of positions, the plurality of reels bearing a plurality of symbols, the plurality of symbols including clusters of multiple value-bearing symbols, each cluster of the clusters of multiple value-bearing symbols, when landed, occupying a single respective position of the array with the multiple value-bearing symbols of the cluster appearing within the single respective position, and each value-bearing symbol bearing a respective credit value; and game-logic circuitry comprising one or more processors and one or more memory devices, the one or more memory devices storing (i) an authentication program, (ii) a trusted authentication code, and (iii) instructions that, when executed by the one or more processors, cause the game-logic circuitry to:

generate, via execution of the authentication program, a live authentication code based on contents of at least one of the one or more memory devices;

compare the live authentication code to the trusted authentication code;

permit execution of random-number-generator programming and game-outcome logic based on the comparing; and in response to permitting execution of the random-number-generator programming and the game-outcome logic;

spinning and stopping the plurality of reels to land symbols from the plurality of symbols in respective positions of the array; and in response to the landed symbols including a triggering combination of clusters of value-bearing symbols;

disbanding each cluster by animating distribution of the value-bearing symbols in each cluster from the single respective position previously occupied by the cluster to different positions in of the array such that, after the disbanding, each value-bearing symbol of the cluster occupies its own respective position of the array and is no longer clustered with other value-bearing symbols of the cluster; and presenting, on the presentation assembly, an award based at least in part on credit values borne by the distributed value-bearing symbols.

11. The gaming system of claim 10, wherein the spinning and stopping operation occurs in a free games feature that is triggered in response to a base-game spin outcome.

12. The gaming system of claim 10, wherein the value-bearing symbols in each cluster are arranged in a respective standard die pip pattern.

13. The gaming system of claim 10, wherein the clusters in the triggering combination include at least a predetermined number of the value-bearing symbols.

14. The gaming system of claim 13, wherein the predetermined number is six.

15. The gaming system of claim 10, wherein after the disbanding operation, the game-logic circuitry is further configured to perform a hold-and-spin feature using a second plurality of reels, the second plurality of reels bearing a plurality of additional value-bearing symbols, the hold-and-spin feature including:

holding the distributed value-bearing symbols in place in the array; and spinning and stopping the second plurality of reels and holding any of the additional value-bearing symbols that land in an unoccupied position in the array;

wherein the presented award is based at least in part on the distributed value-bearing symbols and the held additional value-bearing symbols.

16. The gaming system of claim 10, wherein the operation of disbanding each cluster by animating distribution of the value-bearing symbols in each cluster to different positions in the array includes enlarging and moving the value-bearing symbols in each cluster.

17. The gaming system of claim 10, wherein the gaming machine includes a value input device and a value output device, and wherein the game-logic circuitry is further configured to perform the operations of:

detecting, via a value input device, a physical item associated with a monetary value that establishes a monetary balance; and dispensing, via a value output device, a payout in response to a cashout input that initiates a payout from the monetary balance.

18. The gaming system of claim 10, wherein the gaming machine is regulatorily approved and primarily dedicated to playing a wagering game.

* * * * *